United States Patent [19] [11] 3,884,920
Schmutz et al. [45] May 20, 1975

[54] 11-BASICALLY SUBSTITUTED DIBENZ [B,F] [1,4] OXAZEPINES

[75] Inventors: Jean Schmutz, Muri; Fritz Hunziker; Franz Martin Kunzle, both of Bern, all of Switzerland

[73] Assignee: Sandoz-Wander, Inc., E. Hanover, N.J.

[22] Filed: Dec. 29, 1971

[21] Appl. No.: 213,709

Related U.S. Application Data

[63] Continuation-in-part of Ser. No. 55,603, July 16, 1970, abandoned, which is a continuation-in-part of Ser. No. 797,281, Feb. 6, 1969, Pat. No. 3,546,226, which is a continuation-in-part of Ser. No. 712,956, March 14, 1968, abandoned.

[30] Foreign Application Priority Data

July 14, 1967 Switzerland................. 11015/67
Nov. 3, 1967 Switzerland................. 15453/67
Feb. 14, 1968 Switzerland................. 2201/68

[52] U.S. Cl............................ 260/268 TR; 424/250
[51] Int. Cl.............................................. C07d 51/70
[58] Field of Search............................. 260/268 TR

[56] References Cited
UNITED STATES PATENTS 3,458,516  7/1969  Howell et al. ............... 260/268 TR
3,539,573  11/1970  Schmutz et al. ............. 260/268 TR
3,546,226  12/1970  Schmutz et al. ............. 260/268 TR

*Primary Examiner*—Donald G. Daus
*Attorney, Agent, or Firm*—Gerald D. Sharkin; Robert S. Honor; Thomas O. McGovern

[57] ABSTRACT

Dibenz [b,f] [1,4] oxazepines, basically substituted at the 11-position and substituted at the 2-position with alkylsulphinyl or alkylsulphonyl are useful as neuroleptics and anti-emetics.

8 Claims, No Drawings

11-BASICALLY SUBSTITUTED DIBENZ [B,F] [1,4] OXAZEPINES

This application is a continuation-in-part of our pending application Ser. No. 55,603, filed July 16, 1970 now abandoned which in turn is a continuation-in-part of our then pending application Ser. No. 797,281, filed Feb. 6, 1969, which issued as U.S. Pat. No. 3,546,226 on Dec. 8, 1970, which in turn is a continuation-in-part of our earlier application Ser. No. 712,956, filed Mar. 14, 1968, now abandoned.

This invention is generally concerned with new heterocyclic compounds, and more specifically with new 11-basically substituted dibenz [b,f] [1,4] oxazepines of the formula:

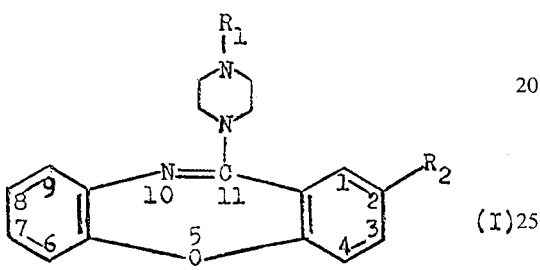

and acid addition salts thereof. In formula I, $R_1$ represents hydrogen, allyl, alkyl containing not more than 3 carbon atoms, hydroxyalkyl containing not more than 3 carbon atoms, alkoxyalkyl containing not more than 6 carbon atoms or alkoyloxyalkyl containing not more than 6 carbon atoms. $R_2$ represents alkylsulphinyl of the formula $-SOR_3$ in which $R_3$ denotes alkyl with not more than 3 carbon atoms; or alkylsulphonyl of the formula $-SO_2R_3$ in which $R_3$ denotes alkyl with not more than 3 carbon atoms.

Compounds of formula I are obtained when a compound of the formula:

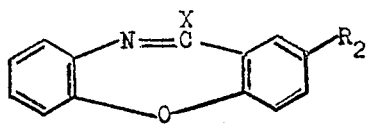

wherein $R_2$ has the meaning defined above and X denotes a residue capable of being split off with the hydrogen of amines, is reacted with piperazine or a piperazine derivatives, respectively, of the formula:

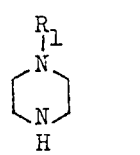

wherein $R_1$ has the above-mentioned meaning.

A residue capable of being split off with the hydrogen of amines, which can be bound ionically or covalently to the carbon atom, can most conveniently be represented by halogen, sulphydryl, or alkoxy and alkylthio which may be activated, e.g. methoxy, thiomethyl or p-nitrobenzylthio, or by tosyl.

Starting materials of the formula II are obtained by converting lactams of the formula:

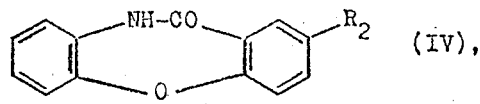

wherein $R_2$ has the meaning given above, into the thiolactams by treatment with phosphorus pentasulfide which may be followed by alkylation, or by reaction of the lactams with a halogenating agent such as phosphorus oxychloride or phosphorus pentachloride, most suitably in the presence of a catalytic amount of dimethylaniline or dimethylformamide. Lactams of formula IV are themselves obtained by ring closure of compounds of the formula:

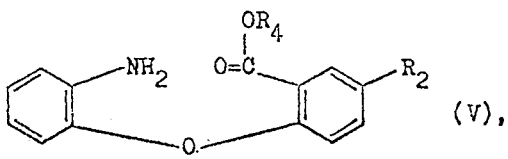

wherein $R_2$ has the above-mentioned meaning and $R_4$ denotes hydrogen or lower alkyl. Lactams of formula IV may also be obtained by ring closure of compounds of the formula:

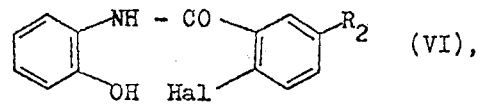

wherein Hal stands for halogen, or of isocyanates of the formula:

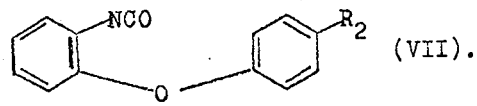

Compounds of formula I may further be obtained by ring closure through intramolecular condensation of acid amides or acid thioamides of the formula:

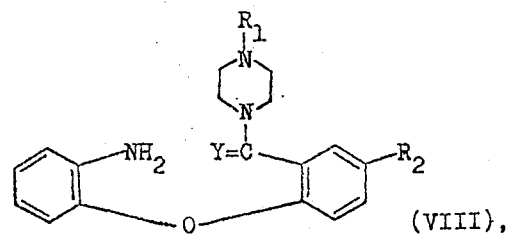

wherein $R_1$ and $R_2$ have the above-mentioned meaning and Y represents oxygen or sulphur. A purely thermal condensation rarely succeeds with the acid amides but rather with the thioamides which are, for example, obtained from the acid amides by treatment with phosphorus pentasulphide and need not be isolated before the following condensation. Especially in the case of the acid amides it is desirable to perform the ring closure in the presence of condensing agents, such as phosphorus pentachloride, phosphorus oxychloride, phosgene, polyphosphoric acid, and the like. It is assumed that the ring closure proceeds by way of intermediate steps such as imidochlorides, amidochlorides, imidophosphates, amidophosphates or salt-like derivatives thereof, which, in general, are not isolatable. The condensation of the thioamides is favoured by the presence of mercury(II) salts or by intermediate formation of imidothioethers which may be activated. Heating and, if required, the use of a suitable inert solvent are desirable, and when using phosphorus oxychloride and phosphorus pentachloride addition of catalytic amounts of dimethylformamide or dimethylaniline.

Compounds of formula I can also be obtained by dehydration of urea derivatives of the formula:

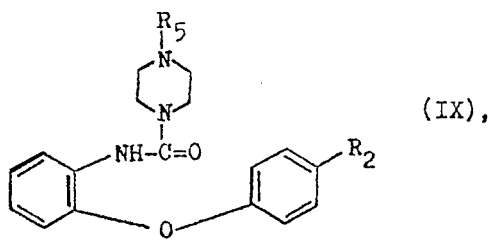

wherein $R_2$ has the above-mentioned meaning and $R_5$ means $R_1$ or denotes a removable group, especially a hydrolytically removable group. The ring closure is preferably carried out by heating in the presence of dehydrating agents such as zinc chloride, aluminium chloride, stannic chloride, phosphoric acid, polyphosphoric acid and the like, especially phosphorus oxychloride or phosphorus oxychloride and phosphorus pentoxide, if desired in an inert solvent of suitable boiling point such as benzene or toluene etc. According to the chosen reaction conditions the starting materials of formula IX with a hydrolytically removable group $R_5$, e.g. carbalkoxy, especially carbethoxy, are cyclicized directly to the 11-(1-piperazinyl) compounds by hydrolysis of the removable group. Other removable groups can be split off after ring closure in a way known per se, e.g. by hydrogenolysis.

The products of formula I can also be obtained when amidines of the formula:

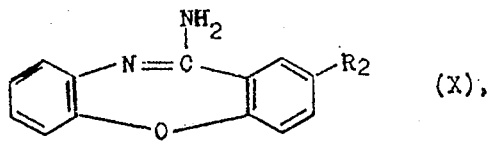

wherein $R_2$ has the above-mentioned meaning, are treated with a reactive ester of an alcohol of the formula:

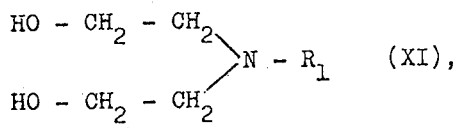

wherein $R_1$ has the above-mentioned meaning. The reaction is carried out following or by simultaneous treatment with a basic catalyst or metallization agent such as sodamide, lithium amide, sodium hydride, butyl lithium, phenyl sodium, sodium ethylate or potassium-t-butoxide. Suitable esters are those of inorganic or organic acids, e.g. hydrohalic acid, sulphonic acid or carbonic acid esters. The required amidines X are in turn obtained by treating compounds of formula II with ammonia.

Finally, compounds of formula I, can also be obtained by mild (e.g. with periodates) or strong (e.g. with hydrogen peroxide or peracetic acid) oxidation of the corresponding thioalkyl compounds. Products wherein $R_2$ represents alkylsulphonyl are also obtainable by strong oxidation of the corresponding alkylsulphinyl compounds.

Compounds of formula I, obtained according to one of the above methods, wherein $R_1$ represents hydrogen can be converted to such compounds wherein $R_1$ does not represent hydrogen, e.g. by treatment with reactive esters of alcohols of the formula $R_1$—OH. Hydrohalic acid or toluenesulphonic acid esters are suitable for this purpose. An alkyl group $R_1$ can also be introduced by the method of reductive alkylation, i.e. by reaction with corresponding aldehydes either with hydrogen in the presence of a catalyst or with a reducing agent such as formic acid. The introduction of a hydroxyalkyl group $R_1$ can also be carried out by treating with a corresponding alkylene oxide.

Compounds of formula I in which $R_1$ denotes a hydroxyalkyl group can be subsequently treated with an acylating agent to obtain products wherein $R_1$ represents an alkoyloxyalkyl group. Acid chlorides and acid anhydrides are especially suitable as acylating agents.

The bases obtained in this manner are in most cases crystallizable or can otherwise be destilled in high vacuum without decomposition and react with inorganic and organic acids such as hydrochloric acid, hydrobromic acid, sulphuric acid, nitric acid, phosphoric acid, acetic acid, oxalic acid, maleic acid, succinic acid, tartaric acid, toluene sulphonic acid and the like to form addition salts which are stable in water, in which form the products may also be used.

The bases obtained in the described manner and their acid addition salts are new compounds which can be used as active substances in pharmaceuticals or as intermediates for the production of such substances. They produce a favourable effect on the central nervous system and may therefore especially be used as neuroleptics or antiemetics.

The antiemetic activity is shown pharmacologically by a strong apomorphine antagonising effect in dogs and rats as well as a comparatively weak cataleptic and locomotor activity suppressing effect. Pronounced antiemetic activity is shown by 2-methylsulphonyl-11-(4-methyl-1-piperazinyl)-dibenz[b,f]-1,4-oxazepine obtained according to Example 1 and its acid addition salts.

The compounds of this invention can be administered in the form of pharmaceutical preparations containing, besides the active substance, organic or inorganic solid or liquid carriers suitable for enteral or parenteral administration. The pharmaceutical preparations may be, for example, in the form of tablets, dragees, or solutions for injection.

In general, satisfactory results are obtained when these compounds are administered at a daily dosage of about 0.07 milligram to about 50 milligrams per kilogram p.o. of animal body weight. For most large mammals such as primates, the total daily dosage is from about 5 milligrams to about 400 milligrams. Dosage forms suitable for internal use comprise from about 10 milligrams to about 25 milligrams of the active compound in intimate admixture with a solid or liquid pharmaceutically acceptable carrier or diluent.

EXAMPLE 1

5 g of 2-Methylsulphonyl-10,11-dihydro-11-oxo-dibenz[b,f]-[1,4]oxazepine (m.p. 242°–244°) and 1.8 ml of N,N-dimethylaniline are refluxed in 50 ml of phosphorus oxychloride for 5 hours after which the reaction mixture is evaporated to dryness in vacuo. The residue is treated with xylene, once again evaporated and then dissolved in xylene and poured onto ice. The aqueous phase is shaken out three times with xylene. The combined xylene extracts are washed with dilute hydrochloric acid, water and aqueous sodium chloride solution, dried over sodium sulphate, treated with active charcoal and filtered through a small amount of aluminium oxide. The filtrate is concentrated and then refluxed with 12 ml of N-methylpiperazine for 6 hours. The reaction mixture is treated with water and concentrated soda lye and shaken out twice with ether. The ether extracts are washed several times with water and then shaken out with dilute hydrochloric acid. The acid extracts are made alkaline and extracted twice with ether. The ether phase is washed with water and aqueous sodium chloride solution, dried over sodium sulphate, treated with active charcoal and filtered through a small amount of aluminium oxide. The filtrate is concentrated and treated with petroleum ether. The crystals which precipitate are dissolved in acetone and, after concentrating, recrystallized by addition of ether/petroleum ether. 5.8 g of 2-methylsulphonyl-11-(4-methyl-1-piperazinyl)-dibenz[b,f][1,4]oxazepine in the form of slightly yellow needles of melting point 178°–179°C are obtained.

EXAMPLE 2

3 g of 2-(4''-Methyl-1''-piperazinyl-carbonylamino)-4'-methylsulphonyl-diphenyloxide (m.p. 145°–146°C) and a mixture of 2 g of phosphorus pentoxide and 10 ml of phosphorus oxychloride are refluxed for 24 hours. The excess phosphorus oxychloride is then distilled off in vacuo and the residue decomposed with ice/water. The solution obtained is made alkaline with concentrated soda lye and shaken out with ether. The ether extracts are washed with water and shaken out thoroughly with dilute hydrochloric acid. The acid extracts are made alkaline with concentrated soda lye and shaken out with chloroform. The chloroform extracts are washed with water, dried over sodium sulphate and evaporated to dryness in vacuo. The residue is crystallized from acetone/petroleum ether and gives 1.5 g of 2-methylsylphonyl-11-(4-methyl-1-piperazinyl)-dibenz[b,f][1,4]oxazepine of melting point 178°–179°C identical to the product obtained according to Example 1.

EXAMPLE 3

The free base obtained from 6.83 g of 2-thiomethyl-11-(4-methyl-1-piperazinyl)-dibenz[b,f][1,4]oxazepine maleate (m.p. 198°–201°C) is dissolved in 40 ml of water and 10 ml of glacial acetic acid. This solution is treated dropwise while stirring at 0°C with a solution of 3.42 g of sodium metaperiodate in 10 ml of water. After the addition is complete the reaction mixture is left to stand at room temperature for 24 hours, then made alkaline with concentrated soda lye and shaken out with ether. The ether extracts are washed with water and then exhaustively shaken out with dilute hydrochloric acid. The acid extracts are made alkaline with concentrated soda lye and shaken out with chloroform. The chloroform extracts are washed with water, dried over sodium sulphate and evaporated to dryness in vacuo. The residue is dissolved in acetone and treated with 1.8 g of maleic acid. After concentration and addition of ether crystals precipitate which are recrystallized from methanol/acetone/ether to give 6.0 g of 2-methylsulphinyl-11-(4-methyl-1-piperazinyl)-dibenz[b,f][1,4]oxazepine maleate of melting point 206°–207°C.

Further products corresponding to formula I given in the following table are obtained by analogous procedures to those given above. In the table $R_1$ and $R_2$ have the above defined meaning. In the column on the right hand side ac means acetone, e = ether, ch = chloroform, me = methanol and pe = petroleum ether.

Table

| Example | $R_1$ | $R_2$ | | melting point |
|---|---|---|---|---|
| 4 | H | $-SO_2CH_3$ | base: | 189–191°C (from ac/e/pe) |
| 5 | $-CH_3$ | $-SO_2C_2H_5$ | base: | 196–197°C (from ch/pe) |
| 6 | H | $-SO_2C_2H_5$ | base: | 130–133°C (from ac/pe) |
| 7 | $-CH_2-CH_2-OH$ | $-SO_2CH_3$ | base: | 175–177°C (from ac/e/pe) |
| 8 | $-CH_2-CH_3$ | $-SO_2CH_3$ | base: | 190–191°C (from ac/pe) |
| 9 | $-CH_2-CH_2-OCH_3$ | $-SO_2CH_3$ | base: | 146–149°C (from ac/e/pe) |
| 10 | $-CH(CH_3)_2$ | $-SO_2CH_3$ | base: | 160–162°C (from ac/e/pe) |
| 11 | $-CH_2-CH_2-CH_3$ | $-SO_2CH_3$ | base: | 146–147°C (from e/pe) |
| 12 | $-CH_2-CH=CH_2$ | $-SO_2CH_3$ | base: | 118–121°C (from e/pe) |
| 13 | $-CH_2-CH_2-CH_2-OH$ | $-SO_2CH_3$ | base: | 160–162°C (from ac/pe) |
| 14 | $-CH_2-CH(OH-)-CH_3$ | $-SO_2CH_3$ | base: | 150–152°C (from ac/pe) |

EXAMPLE 15

Production of Tablets

For the manufacture of tablets, the products of this invention can be mixed with lactose and granulated with water, 0.5% sodium alginate or 1% gelatine solution. The dried granulate is compressed into tablets in the presence of about 5% of talcum, 5% of corn starch and 0.1% of magnesium stearate. In this way, there are obtained, e.g. tablets of the following composition:

| | |
|---|---|
| methylsulphonyl-11-(4-methyl-1-piperazinyl)-dibenz[b,f][1,4] oxazepine | 10 mg. |
| Lactose | 70 mg. |
| Corn Starch | 5 mg. |
| Talcum | 5 mg. |
| Magnesium stearate | 0.1 mg. |

These 90 mg tablets, which are provided with a crackline, can be administered orally in a dosage of one half to two tablets one to three times per day in the treatment of subjects suffering from nausea and vomiting following operations or ray treatment or due to stomach or metabolism disorders, intoxications, drug incompatability, pressure on the brain or pregnancy. These tablets may also be used prophylactically against post operative vomiting.

Similarly, tablets useful in the treatment of emesis containing the following compounds as the active ingredient may also be prepared:
1. 2-Methylsulphinyl-11-(4-methyl-1-piperazinyl)-dibenz [b,f] [1,4] oxazepine and its acid addition salts.
2. 2-Methylsulphonyl-11-(4-β-hydroxyethyl-1-piperazinyl)-dibenz [b,f][1,4] oxazepine and its acid addition salts.
3. 2-Methylsulphonyl-11-(4-ethyl-1-piperazinyl)-dibenz [b,f][1,4] oxazepine and its acid addition salts.
4. 2-Methylsulphonyl-11-(4-β-methoxyethyl-1-piperazinyl)-dibenz [b,f][1,4] oxazepine and its acid addition salts.
5. 2-Methylsulphonyl-11-(1-piperazinyl)-dibenz [b,f] [1,4] oxazepine and its acid addition salts.
6. 2-Ethylsulphonyl-11-(4-methyl-1-piperazinyl)-dibenz [b,f] [1,4]oxazepine and its acid addition salts.
7. 2-Ethylsulphonyl-11-(1-piperazinyl)-dibenz[b,f][1,4]-oxazepine and its acid addition salts.
8. 2-Methylsulphonyl-11-(4-isopropyl-1-piperazinyl)-dibenz [b,f][1,4]oxazepine and its acid addition salts.
9. 2-Methylsulphonyl-11-(4-propyl-1-piperazinyl)-dibenz[b,f][1,4]oxazepine and its acid addition salts.
10. 2-Methylsulphonyl-11-(4-allyl-1-piperazinyl)-dibenz[b,f][1,4]oxazepine and its acid additon salts.
11. 2-Methylsulphonyl-11-(4-γ-hydroxypropyl-1-piperazinyl) -dibenz [b,f][1,4] oxazepine and its acid addition salts.
12. 2-Methylsulphonyl-11-(4-βhydroxypropyl-1-piperazinyl) -dibenz [b,f] [1,4] oxazepine and its acid addition salts.

EXAMPLE 16

Dry Filled Capsules

Capsules containing the ingredients indicated below may be prepared by conventional techniques and are useful in treating emesis at a dose of one capsule 2 to 4 times a day.

| Ingredient | Weight (mg) Capsule |
| --- | --- |
| methylsulphonyl-11-(4-methyl-1-piperazinyl)-dibenz [b,f][1,4] oxazepine | 10 |
| Inert solid diluent (starch, paolin, lactose, etc) | 290 |

Similarly capsules useful in the treatment of emesis containing the following compounds as the active ingredient may also be prepared:
1. 2-Methylsulphinyl-11-(4-methyl-1-piperazinyl)-dibenz [b,f][1,4]oxazepine and its acid addition salts.
2. 2-Methylsulphonyl-11-(4-β-hydroxyethyl-1-piperazinyl)-dibenz [b,f] [1,4] oxazepine and its acid addition salts.
3. 2-Methylsulphonyl-11-(4-ethyl-1-piperazinyl)-dibenz [b,f] [1,4]oxazepine and its acid addition salts.
4. 2-Methylsulphonyl-11-(4-β-methoxyethyl-1-piperazinyl)-dibenz [b,f][1,4] oxazepine and its acid additon salts.
5. 2-Methylsulphonyl-11-(1-piperazinyl)-dibenz [b,f] [1,4]-oxazepine and its acid addition salts.
6. 2-Ethylsulphonyl-11-(4-methyl-1-piperazinyl)-dibenz [b,f] [1,4] oxazepine and its acid addition salts.
7. 2-Ethylsulphonyl-11-(1-piperazinyl)-dibenz [b,f] [1,4] oxazepine and its acid addition salts.
8. 2-Methylsulphonyl-11-(4-isopropyl-1-piperazinyl)-dibenz-[b,f] [1,4] oxazepine and its acid addition salts.
9. 2-Methylsulphonyl-11-(4-propyl-1-piperazinyl)-dibenz [b,f][1,4] oxazepine and its acid addition salts.
10. 2-Methylsulphonyl-11-(4-allyl-1-piperazinyl)-dibenz [b,f][1,4] oxazepine and its acid addition salts.
11. 2-Methylsulphonyl-11-(4-γ-hydroxypropyl-1-piperazinyl) dibenz [b,f] [1,4] oxazepine and its acid addition salts.
12. 2-Methylsulphonyl-11-(4-β-hydroxypropyl-1-piperazinyl)-dibenz [b,f][1,4]oxazepine and its acid addition salts.

EXAMPLES 17 and 18

Sterile Suspension for Injection and Oral Liquid Suspension

The following pharmaceutical compositions are formulated with the indicated amount of active agent using conventional techniques. The injectable suspension and the oral liquid suspension represents formulations useful as unit doses and may be administered in the treatment of emesis. The injectable suspension is suitable for administration once a day whereas the oral liquid suspension is suitably administered 2 to 4 times per day for this purpose.

| Ingredients | Weight (mg) | |
| --- | --- | --- |
|  | sterile injectable suspension | oral liquid suspension |
| methylsulphonyl-11-(4-methyl-1-piperazinyl)-dibenz [b,f][1,4]oxazepine | 10 | 10 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, propyl paraben, USP | — | 4.5 1.0 |
| polysorbate 80 (e.g. Tween 80), U.S.P. | — | 5 |
| sorbitol solution, 70%, USP | — | 2,500 |
| buffer agent to adjust pH for desired stability | q.s. | q.s. |
| water | for injection q.s. to 1 ml. | q.s. to 5 ml. |

Sterile injectable suspensions and oral liquid suspensions are similarly prepared using:
1. 2-Methylsulphinyl-11-(4-methyl-1-piperazinyl)-dibenz [b,f] [1,4] oxazepine and its acid addition salts.
2. 2-Methylsulphonyl-11-(4-β-hydroxyethyl-1-piperazinyl) -dibenz [b,f][1,4] oxazepine and its acid addition salts.
3. 2-Methylsulphonyl-11-(4-ethyl-1-piperazinyl)-dibenz [b,f] [1,4]oxazepine and its acid addition salts.

4. 2-Methylsulphonyl-11-(4-β-methoxyethyl-1-piperazinyl)-dibenz [b,f][1,4] oxazepine and its acid addition salts.

5. 2-Methylsulphonyl-11-(1-piperazinyl)-dibenz [b,f] [1,4] oxazepine and its acid addition salts.

6. 2-Ethylsulphonyl-11-(4-methyl-1-piperazinyl)-dibenz [b,f] [1,4]oxazepine and its acid addition salts.

7. 2-Ethylsulphonyl-11-(1-piperazinyl)-dibenz [b,f] [1,4] oxazepine and its acid addition salts.

8. 2-Methylsulphonyl-11-(4-isopropyl-1-piperazinyl)-dibenz [b,f][1,4] oxazepine and its acid addition salts.

9. 2-Methylsulphonyl-11-(4-propyl-1-piperazinyl)-dibenz [b,f][1,4] oxazepine and its acid addition salts.

10. 2-Methylsulphonyl-11-(4-allyl-1-piperazinyl)-dibenz-[b,f][1,4] oxazepine and its acid addition salts.

11. 2-Methylsulphonyl-11-(4-γ-hydroxypropyl-1-piperazinyl) dibenz [b,f][1,4] oxazepine and its acid addition salts.

12. 2-Methylsulphonyl-11-(4-β-hydroxypropyl-1-piperazinyl)-dibenz [b,f][1,4] oxazepine and its acid addition salts.

We claim:

1. The compound, which is 2-Methylsulphonyl-11-(4-methyl-1-piperazinyl)-dibenz[b,f] [1,4] oxazepine and its acid addition salts.

2. The compound, which is 2-Methylsulphonyl-11-(4-ethyl-1-piperazinyl)-dibenz [b,f] [1,4] oxazepine and its acid addition salts.

3. The compound, which is 2-Methylsulphonyl-11-(1-piperazinyl)-dibenz[b,f][1,4]-oxazepine and its acid addition salts.

4. The compound, which is 2-Ethylsulphonyl-11-(4-methyl-1-piperazinyl)-dibenz [b,f] [1,4] oxazepine and its acid addition salts.

5. The compound, which is 2-Ethylsulphonyl-11-(1-piperazinyl)-dibenz [b,f] [1,4] oxazepine and its acid addition salts.

6. The compound, which is 2-Methylsulphonyl-11-(4-isopropyl-1-piperazinyl)-dibenz [b,f][1,4] oxazepine and its acid addition salts.

7. The compound, which is 2-Methylsulphonyl-11-(4-propyl-1-piperazinyl)-dibenz [b,f][1,4]oxazepine and its acid addition salts.

8. The compound which is 2-methylsulphonyl-11-(4-methyl-1-piperazinyl)-dibenz [b,f] [1,4] oxazepine maleate.

* * * * *

UNITED STATES PATENT OFFICE
CERTIFICATE OF CORRECTION

Patent No. 3,884,920      Dated May 20, 1975

Inventor(s) JEAN SCHMUTZ, ET AL

It is certified that error appears in the above-identified patent and that said Letters Patent are hereby corrected as shown below:

| | |
|---|---|
| Title page, lines 1 and 2 | "11-BASICALLY SUBSTITUTED DIBENZ [B,F][1,4]OXAZEPINES" should be --11-BASICALLY SUBSTITUTED DIBENZ [b,f][1,4]OXAZEPINES-- |
| Column 1, lines 1 and 2 | "11-BASICALLY SUBSTITUTED DIBENZ [B,F][1,4]OXAZEPINES" should be --11-BASICALLY SUBSTITUTED DIBENZ [b,f][1,4]OXAZEPINES-- |
| Column 7, lines 34 to 36 | "12. 2-Methylsulphonyl-11-(4-βhydroxypropyl-1-piperazinyl)-dibenz [b,f][1,4]oxazepines and its acid addition salts" should be --12. 2-Methylsulphonyl-11-(4-β-hydroxypropyl-1-piperzinyl)-dibenz [b,f][1,4]oxazepines and its acid addition salts-- |
| Column 8, line 49 (second column) | "flavor  -                     " should be --flavor  -    q.s.-- |

Signed and Sealed this fourth Day of May 1976

[SEAL]

Attest:

RUTH C. MASON  
Attesting Officer

C. MARSHALL DANN  
Commissioner of Patents and Trademarks